United States Patent
Meo et al.

(10) Patent No.: US 12,506,681 B2
(45) Date of Patent: Dec. 23, 2025

(54) END-TO-END FLOW PATH TRACING AND DEBUGGABILITY IN HYBRID TENANT ROUTED MULTICAST NETWORKS

(71) Applicant: Cisco Technology, Inc., San Jose, CA (US)

(72) Inventors: Francesco Meo, San Jose, CA (US); Sachin V Vishwarupe, Santa Clara, CA (US); Lakshmi Ramesh, San Jose, CA (US); Roshan Lal, Gilroy, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 411 days.

(21) Appl. No.: 18/315,860

(22) Filed: May 11, 2023

(65) Prior Publication Data

US 2024/0380686 A1 Nov. 14, 2024

(51) Int. Cl.
*H04L 45/16* (2022.01)

(52) U.S. Cl.
CPC .................................. *H04L 45/16* (2013.01)

(58) Field of Classification Search
CPC ......... H04L 45/16; H04L 45/24; H04L 45/64; H04L 43/0882
See application file for complete search history.

(56) References Cited

U.S. PATENT DOCUMENTS

| 10,924,419 B1* | 2/2021 | Chitalia | H04L 47/125 |
| 2015/0188723 A1* | 7/2015 | Moreno | H04L 61/5038 370/390 |
| 2018/0006930 A1 | 1/2018 | Du et al. | |
| 2018/0013670 A1 | 1/2018 | Kapadia et al. | |
| 2018/0191471 A1* | 7/2018 | Elhaddad | H04L 1/24 |
| 2019/0238364 A1* | 8/2019 | Boutros | H04L 12/4633 |
| 2019/0238450 A1* | 8/2019 | Michael | H04L 43/20 |
| 2021/0051100 A1* | 2/2021 | Chitalia | H04L 41/22 |
| 2021/0075630 A1 | 3/2021 | Immidi et al. | |

(Continued)

OTHER PUBLICATIONS

Cisco, "Configuring Tenant Routed Multicast," Cisco.com, retrieved from the Internet on Feb. 27, 2023, 24 pages.

(Continued)

*Primary Examiner* — Kenny S Lin
(74) *Attorney, Agent, or Firm* — Edell, Shapiro & Finnan, LLC

(57) ABSTRACT

Methods are provided for path tracing and visibility for tenant routed multicast (TRM) flows including validating the TRM flows based on path tracing on various layers including overlay and underlay. Specifically, the methods involve obtaining at least one tenant flow data record for a tenant routed multicast traffic flow that traverses from a source, along a path in a network, to at least one destination. The at least one tenant flow data record includes underlay encapsulation information and tenant information. The methods further involve generating a merged flow data record in which the tenant information of a tenant incoming interface flow record is mapped to the underlay encapsulation information based on the at least one tenant flow data record and providing an end-to-end visibility of the path traversed by the tenant routed multicast traffic flow including a tenant path and an underlay path based on the merged flow data record.

20 Claims, 8 Drawing Sheets

(56) References Cited

U.S. PATENT DOCUMENTS

| | | | |
|---|---|---|---|
| 2022/0006726 A1* | 1/2022 | Michael | H04L 45/745 |
| 2022/0014451 A1 | 1/2022 | Naik et al. | |
| 2022/0191120 A1* | 6/2022 | Dikshit | H04L 43/0817 |
| 2024/0171512 A1* | 5/2024 | Mcdougall | H04L 45/76 |

OTHER PUBLICATIONS

Gunkel, T., "Multicast flow monitoring and path visualization for all-IP broadcast infrastructures," Blog Post, https://skyline.be/skyline/news/multicast-flow-monitoring-and-path-visualization-all-ip-broadcast-infrastructures, Mar. 20, 2020, 4 pages.

Lel, K., et al., "Measuring the Consistency Between Data and Control Plane in SDN," https://ieeexplore.ieee.org/document/9854881/, Aug. 11, 2022, 4 pages.

Yu, Y., et al., "FALCON: Differential fault localization for SDN control pane," ScienceDirect, Computer Networks, vol. 162, 10685, https://doi.org/10.1016/j.comnet.2019.07.007, Oct. 24, 2019, 11 pages.

* cited by examiner

FIG. 5

| | 512a | 512b | 512c | 512d | 512e | 512f | 512g | 512h | 512i | 512j | 512k | |
|---|---|---|---|---|---|---|---|---|---|---|---|---|
| | | | | | | | | | | | | |
| | VRF | Encap | Multicast IP | Flow Link State | Sender | Receiver Interface IP | Sender Switch | Sender Interface | Receiver Switch | Receiver Interface | Sender Start Time | Receiver Join Time |
| | trmvrf-3205 | VXLAN_TRM | 225.5.1.20 | active | 7.70.1.196 | 7.70.1.1 | S1-BGW1 | Vlan1820 | DV-Bud | Vlan1820:Ethern | Mon Jan 30 17:46:01 UTC 2023 | Mon Jan 30 17:43:05 UTC 2023 |
| | trmvrf-3 | — L3VNi: 33205<br>Encap Source: 60.60.60.60<br>Encap Group: 226.0.0.43 | 1.19 | active | 7.69.1.196 | 7.69.1.1 | S1-BGW1 | Vlan1819 | SHU1 | Vlan1819:Po300 | Mon Jan 30 17:46:01 UTC 2023 | Mon Jan 30 17:43:06 UTC 2023 |
| | xxx | VXLAN_TRM | 225.6.1.19 | active | 7.69.1.196 | 7.69.1.1 | S1-BGW1 | Vlan1819 | SHU1 | Vlan1819:Po305 | Mon Jan 30 17:46:01 UTC 2023 | Mon Jan 30 17:43:06 UTC 2023 |

Flow Status | Flow Alias

Active | Inactive | Sender Only | Receiver Only 500, 510, 514

END-TO-END FLOW PATH TRACING AND DEBUGGABILITY IN HYBRID TENANT ROUTED MULTICAST NETWORKS

TECHNICAL FIELD

The present disclosure generally relates to computer networks and systems.

BACKGROUND

Multicast-based networks are complex networks to build and maintain. Multicast over virtual extensible local area network (VXLAN) is commonly known as Tenant Routed Multicast (TRM) network. TRM network enables multicast forwarding on the VXLAN fabric that uses a Border Gateway Protocol (BGP) based Ethernet virtual private network (EVPN) control plane and next generation multicast virtual private network (NGMVPN) control plane. TRM network provides multi-tenancy aware multicast forwarding between multiple senders and receivers within the same subnet (local forwarding) or different subnets i.e., across virtual extensible LAN network devices (VTEPs). Because of the added complexity of BGP EVPN control plane that exists in TRM networks, monitoring and managing these TRM networks is even more complicated and challenging.

BRIEF DESCRIPTION OF THE DRAWINGS

FIG. 5 is a diagram depicting another user interface that provides states for TRM traffic flows, according to an example embodiment.

DETAILED DESCRIPTION

Overview

Figure 1:
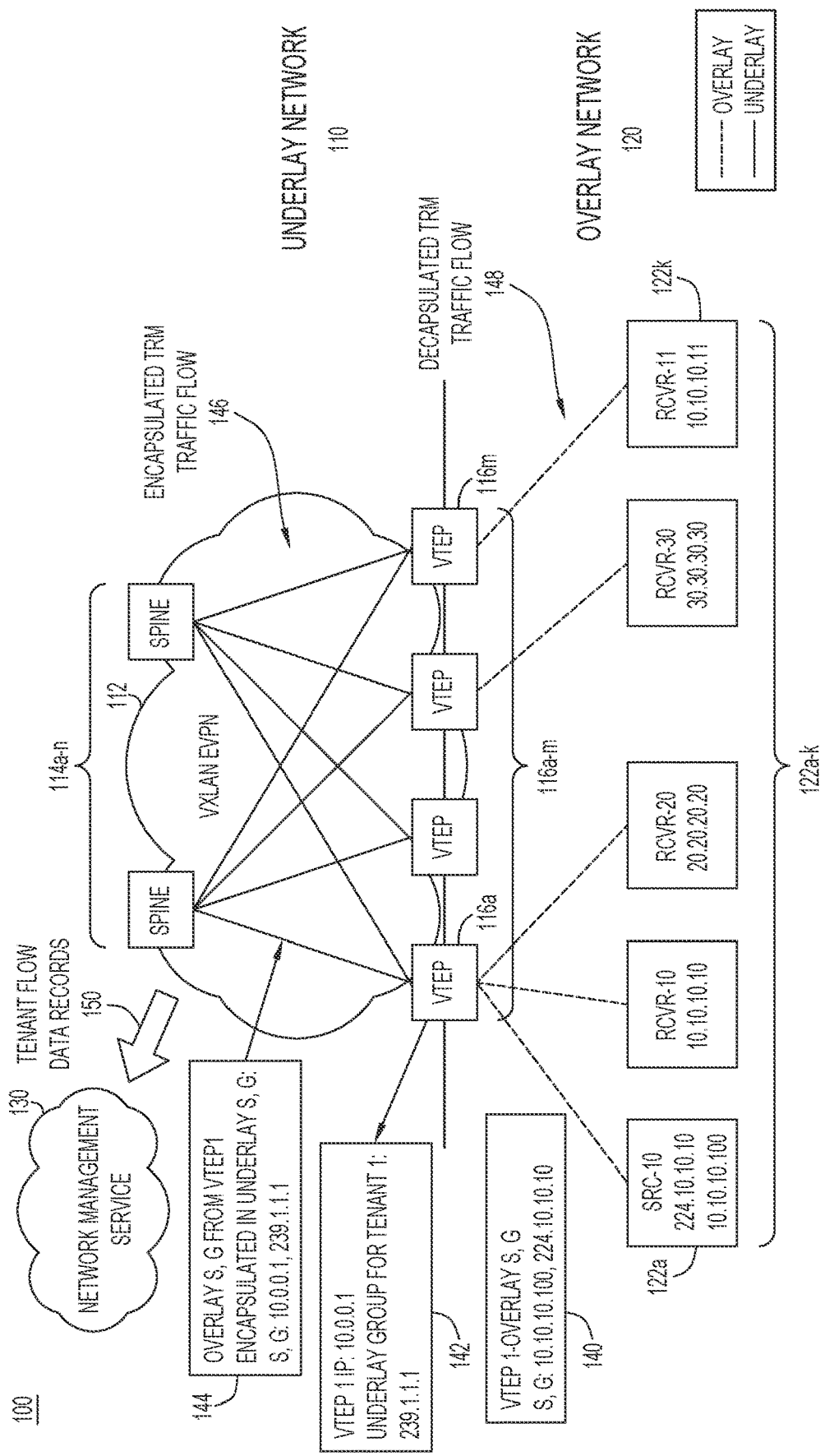
FIG. 1 is a diagram illustrating a system in which an end-to-end path, traversed by a tenant routed multicast traffic flow, including a tenant path and an underlay path, is traced and tracked, according to an example embodiment.

Techniques presented herein provide for path tracing and visibility for tenant routed multicast (TRM) flows including validating the TRM flows based on path tracing on various layers including an overlay layer and an underlay layer.

In one form, the methods involve obtaining at least one tenant flow data record for a tenant routed multicast traffic flow that traverses from a source, along a path in a network, to at least one destination. The at least one tenant flow data record includes underlay encapsulation information and tenant information. The methods further involve generating a merged flow data record in which the tenant information of a tenant incoming interface flow record is mapped to the underlay encapsulation information based on the at least one tenant flow data record. The methods further involve providing an end-to-end visibility of the path traversed by the tenant routed multicast traffic flow including a tenant path and an underlay path based on the merged flow data record.

Example Embodiments

TRM is an efficient multicast delivery method for media data such as audio and video streams. However, when adding to the complexity of a native multicast network, the complexity of BGP EVPN control plane, debugging TRM traffic flows is difficult and time consuming. Further, since encapsulation and decapsulation are involved, path traceability and debugging are even more challenging.

Typically, debugging in TRM networks involves a network operator inspecting states of multiple protocols and hardware states of associated network devices. Inspecting is performed on every node tracing the path of the traffic flow until the failure point is identified. Debugging may become even more complex depending on the source/receiver position and various network topologies supported i.e., intra-site, multisite, etc.

In the case of TRM traffic flow, since the TRM traffic flow runs on a VXLAN network, overlay traffic (tenant traffic) is VXLAN encapsulated with an Underlay information such as source S and group G, to send the TRM traffic on the underlay (carrier) network. This encapsulated TRM traffic flow traverses in the VXLAN network to VTEPs where receivers are present. These VTEPs decapsulate the TRM traffic flow and then forward the decapsulated TRM traffic flow to the respective receivers. As noted above, the process of encapsulation and decapsulation makes path traceability and debugging difficult.

Typically, only partial visibility of traffic flows in native multicast networks is provided. Further, no auto-debuggability exists for native multicast networks and/or TRM based multicast networks. No path tracing and visibility exists in case of multicast in overlay networks where path traversal requires heavy correlation between an overlay flow (e.g., tenant) and underlay flows (multicast) to obtain the end-to-end path visibility. Existing approaches may attempt to provide path visibility of a native multicast flow using manual path tracing and then perform manual debugging. Further, existing approaches cannot handle VXLAN-based TRM flows which include additional complexity of encapsulating overlay multicast traffic with an underlay source and group relevant only in the underlay layer 3 (L3) routing context.

The techniques presented herein provide a complete or end-to-end path traceability along with auto-debuggability for TRM traffic flows. The techniques provide VXLAN TRM network observability by providing a flow state analyzer that includes flow path visibility and flow state validation. The techniques provide for end-user controlled and/or interactive approach with respect to collecting, representing, and analyzing TRM traffic flows across relevant network nodes along the path being traversed by the respective TRM traffic flow.

The techniques involve obtaining at least one tenant flow data record for a tenant routed multicast traffic flow that traverses from a source, along a path in a network, to at least one destination. The at least one tenant flow data record includes underlay encapsulation information and tenant information. The techniques further involve generating a merged flow data record in which the tenant information of a tenant incoming interface flow record is mapped to the underlay encapsulation information based on the at least one tenant flow data record. The techniques further involve providing an end-to-end visibility of the path traversed by the tenant routed multicast traffic flow including a tenant path and an underlay path (such as Layer 3 multicast) based on one or more merged flow data records.

Additionally, the techniques involve proactive and reactive monitoring and debugging. By obtaining visibility of network-wide and end-to-end paths traversed by TRM traffic flows, the TRM traffic flow states are determined and monitored. For example, when an active TRM traffic flow encounters no traffic or intermittent packet drops, debugging may be triggered to locate the root cause of specific problems in the given flow path. Moreover, reactive monitoring may be triggered based on user input to identify issues with specific TRM traffic flow(s).

The techniques presented herein reduce time and human involvement needed to debug and troubleshoot TRM traffic flows. Given the large-scale and complex nature of TRM networks, visualization and auto-debuggability features not only help improve the quality and reliability of the TRM networks but also reduce time and costs associated with resolving potential issues or problems with TRM traffic flows.

In this disclosure, traffic flow, data flow, media traffic flow, network flow, or packet flow may be used interchangeably. A traffic flow is a collection of packets that share the same attributes such as the same source and a group of receivers as the destination in case of multicast traffic flow. Further, a TRM traffic flow means that the traffic flow is multicast forwarded on VXLAN fabric and is specific to a particular tenant. The individual tenant multicast group addresses in the TRM network are mapped to the respective underlay multicast address for replication and transport.

FIG. 1 is a diagram illustrating a system 100 in which an end-to-end path, traversed by a tenant routed multicast traffic flow, including a tenant path and an underlay path, is traced and tracked, according to an example embodiment. The system 100 includes an underlay network 110 and an overlay network 120 with respect to Layer 3 of Open Systems Interconnect (OSI). The system 100 further includes a network management service 130.

The system 100 is an example of Layer 3 TRM single site network e.g., a single site of a virtual data center that may provide media data or other data to one or more endpoints. The virtual data center may be deployed on virtual devices being executed by distributed hardware platforms (e.g., various servers). This is just one example. The system 100 may include multiple sites, other entities, and/or nodes depending on a particular deployment and/or use case scenario. The system 100 may further include other underlay networks for a tenant multicast overlay network.

In the system 100, the underlay network 110 is a virtual network infrastructure for transporting multicast data. In one example embodiment, the underlay network 110 includes a VXLAN EVPN network 112. The traffic flow is transported via VXLAN tunnels in the VXLAN EVPN network 112 between virtual network devices. The underlay network 110 is a multicast underlay of a tenant overlay (i.e., the tenant overlay partitions the virtual network among multiple tenants thus forming virtual network segments). The underlay network 110 provides scalable multicast routing functionality (virtual routing and forwarding "VRF"). The underlay network 110 includes a plurality of network devices such as spine network nodes 114$a$-$n$ and VTEPs 116$a$-$m$.

The notations 1, 2, 3, . . . n; a, b, c . . . n; "a-n", "a-m", "a-f", "a-g", "a-k", "a-c", and the like illustrate that the number of elements can vary depending on a particular implementation and is not limited to the number of elements being depicted or described. Moreover, this is only an example of various components, and the number and types of components, functions, etc. may vary based on a particular deployment and use case scenario.

The spine network nodes 114$a$-$n$ are spine switches, routers, etc. that forward or multicast encapsulated TRM traffic flows to one or more leaf switches such as the VTEPs 116$a$-$m$. VTEPs 116$a$-$m$ are VXLAN tunnel endpoints that perform encapsulation and de-encapsulation. The VTEPs 116$a$-$m$ use IP address to encapsulate Ethernet frames and transmit (multicast) the packets of a TRM traffic flow on the VXLAN EVPN network 112.

The VTEPs 116$a$-$m$ are gateways that map the underlay information with the overlay information for traffic monitoring and troubleshooting including path tracing and traffic state validation. In one or more example embodiments, the VTEPs 116$a$-$m$ generate tenant flow data records that include underlay encapsulation information mapped to or together with tenant information. By providing the tenant flow data records to the network management service 130, the network management service 130 e.g., a network controller, can link the underlay with overlay and provide visibility for an end-to-end path traversed by the TRM traffic flow including the tenant path (overlay) and the underlay path (VXLAN multicast).

The overlay network 120 is a virtual tenant segmented network that is built on top of the underlay network 110. The overlay network 120 includes a plurality of endpoint devices 122$a$-$k$. The endpoint devices 122$a$-$k$ are user devices such as personal computers, laptops, tablets, computing device, and so on. The endpoint devices 122$a$-$k$ include a central processing unit (CPU), a memory, a network interface, and may include input/output devices (camera, microphone, a display, etc.).

In the system 100, the endpoint devices 122$a$-$k$ include a data source device 122$a$ and a data sink device 122$k$. The data source device 122$a$ may be a camera or the like that generates media data such as video or audio. The data sink device 122$k$ may be a computer, a smart phone, or the like that outputs the media data via a display or a monitor. The overlay network 120 also includes the VTEPs 116$a$-$m$ that encapsulate the tenant routed multicast traffic flow for transport in the underlay network 110. As noted above, the VTEPs 116$a$-$m$ serve as gateways or bridges between the underlay network 110 and the overlay network 120.

Each VTEP has two interfaces associated with the overlay network 120. For example, one interface is a Layer 2 interface on the local LAN segment to support a local endpoint communication through bridging. The other is a Layer 3 interface on the IP transport network. Specifically, each VTEP has an overlay input interface (tenant IIF), an overlay output interface (tenant OIF), an underlay input interface (multicast IIF) and underlay output interface (multicast OIF), detailed below.

The network management service 130 is one or more network management platforms that deploy services for monitoring, visualizing, and troubleshooting TRM traffic flows that traverse the TRM network, for managing sender/receiver endpoints and network devices at various layers including the underlay layer and the overlay layer, deploying flow control policies for the TRM network, etc. In one example, the network management service 130 is a network controller.

The network management service 130 provides path traceability for TRM traffic flows in TRM networks. Specifically, the network management service 130 includes a flow state analyzer the provides complete path traceability along with auto-debuggability features for TRM traffic flows based on tenant flow data records obtained from the VTEPs 116a-m. The flow state analyzer includes (1) a flow state visualization component and (2) a flow state validation component.

The flow state visualization component generates merged data records based on the tenant flow data records obtained from the VTEPs 116a-m and thus provides flow path visibility for TRM traffic flows. The end-to-end visibility of the path includes a tenant path and an underlay path with involved network nodes and links. The tenant path is visualized in a distinguishable manner from the underlay path. One example of the flow state visualization component is further detailed with reference to FIGS. 3 and 4.

The flow state validation component is an example of a debugging tool that determines states of the tenant routed multicast (TRM) traffic flows based on the end-to-end visibility of the path provided by the flow state visualization component. The traffic states include an active flow state, an inactive flow state, a sender only flow state, and a receiver only flow state. Active flows are TRM flows that traverse from a source, along the path in a network, to a destination (group of receivers). Inactive flows do not have an end-to-end path from the source (sender) to the destination. For example, if there is a down link along the path being traversed by the TRM traffic flow, if there is a faulty intermediate network node, insufficient bandwidth, etc., the TRM traffic flow is classified as inactive. TRM traffic flows that have a sender streaming data but there are no receivers interested in the data, are sender only traffic flows. Similarly, if receivers request data but there are no sources that provide the data, the TRM traffic flow is a receiver only traffic flow.

Figure 6:
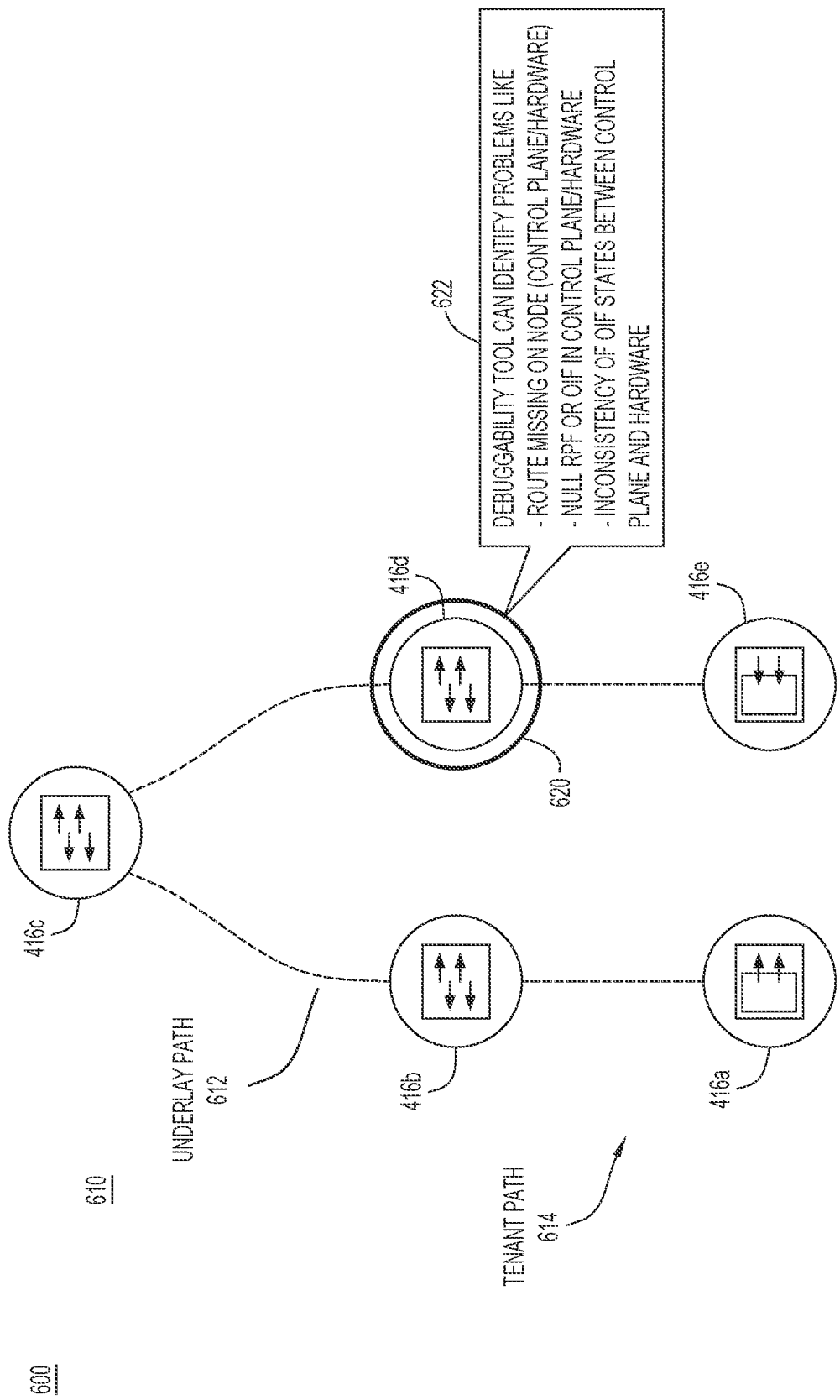
FIG. 6 is a diagram depicting yet another user interface that identifies a network issue in an end-to-end path traversed by a TRM traffic flow, according to an example embodiment.

The flow state validation component may proactively monitor TRM traffic flow states and based on an active TRM traffic flow becoming inactive (i.e., no traffic or intermittent packet drops), perform troubleshooting to detect and identify the root cause of the problem. In one example embodiment, change in the traffic flow state may trigger debugging/troubleshooting of the TRM traffic flow. The flow state validation component also performs reactive monitoring in which additional information is provided based on input by the user. One example of the flow state validation component is further detailed in FIGS. 5 and 6.

These are just some examples of the entities in the system 100. Network devices or network nodes in the system 100 may be any network devices such as access points, gateways, switches, routers, hubs, bridges, gateways, and so on. In one or more example embodiments, the network devices are transport nodes, e.g., a first hop routers, last hop routers, and various intermediate network devices (transit nodes).

The network devices may include, but are not limited to, switches, virtual routers, leaf nodes, spine nodes, etc. The network devices include a central processing unit (CPU), a memory, a packet processing logic, an ingress interface, an egress interface, one or more buffers for storing various packets of various traffic flows, and one or more interface queues. Other entities of the system 100 may include a central processing unit (CPU), a memory, a network interface, and input/output interfaces such as a keyboard, display, etc.

In one example embodiment, a first VTEP 116a is a first hop router (FHR) that encapsulates incoming TRM traffic flow received from a data source device 122a and a second VTEP 116m is a last hop router (LHR) that decapsulates the incoming TRM traffic flow to be provided/forward to a data sink device 122k (one of the receivers).

Specifically, the data source device 122a generates data and at 140, transmits/sends the data as tenant routed multicast (TRM) traffic flow to the first VTEP 116a (e.g., FHR). The TRM traffic flow includes metadata such as an identification or information about the source (the data source device 122a) and the group (receivers) in the overlay network 120. For example, the source S has the identification of 10.10.10.100 and the group G has the identification of 224.10.10.10.

At 142, the first VTEP 116a encapsulates the TRM traffic flow with the underlay information. Since the underlay is VXLAN, the underlay information includes an underlay source (e.g., underlay source S is the FHR with an IP address of 10.0.0.1) and an underlay group (e.g., underlay group G for tenant 1 has an identification/IP address of 239.1.1.1).

At 144, the first VTEP 116a multicasts the encapsulated TRM traffic flow to the spine nodes 114a-n. The encapsulated TRM traffic flow traverses along the path through the VXLAN EVPN network 112.

At 146, the encapsulated TRM traffic flow is received by a second VTEP 116m (e.g., LHR). The second VTEP 116m decapsulates the TRM traffic flow and at 148, provides the decapsulated TRM traffic flow to the data sink device 122k (and other receivers in the group).

Additionally, each of the network nodes in the underlay network 110 and the overlay network 120 provide telemetry to network management service 130. Telemetry includes flow data records. For example, at 150, the first VTEP 116a and the second VTEP 116m provide tenant flow data records for a tenant routed multicast traffic flow that traverses from a source, along a path in a network, to at least one destination, in which the underlay encapsulation information is mapped to the tenant information.

The network management service 130 generates merged flow data records in which the tenant information of a tenant incoming interface flow record is mapped to the underlay encapsulation information based on the at least one tenant flow data record. This allows the network management service 130 to provide visibility of the end-to-end path traversed by the TRM traffic flow including the tenant path and the underlay path, which may be visualized in a distinguishable manner, as detailed below.

Figure 2:
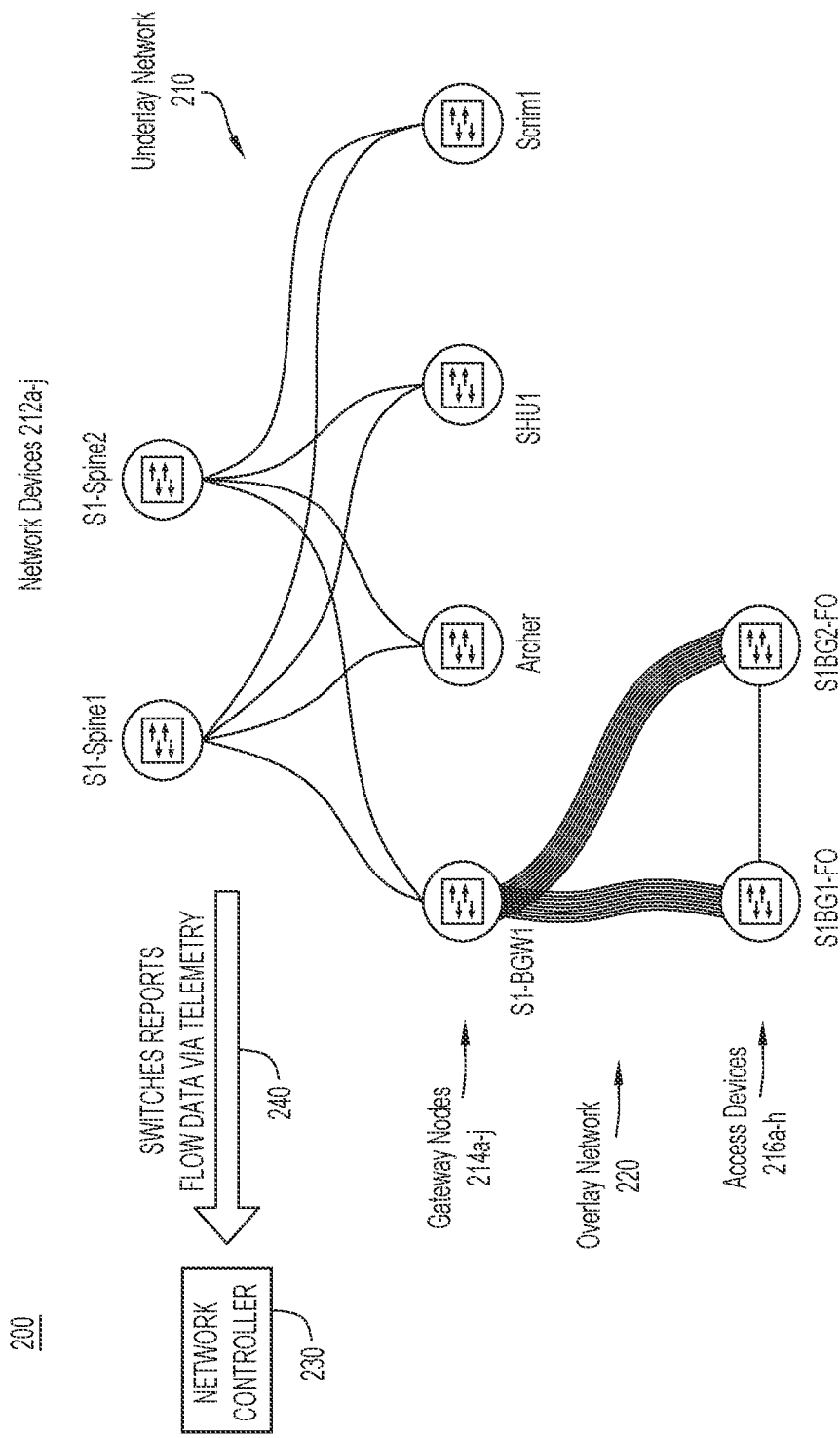
FIG. 2 is a diagram illustrating a system in which a tenant flow data records that includes an underlay encapsulation information associated with tenant information, is generated for a TRM traffic flow, according to an example embodiment.

With continued reference to FIG. 1, FIG. 2 is a diagram illustrating a system 200 in which a tenant flow data records that includes an underlay encapsulation information associated with tenant information, is generated for a TRM traffic flow, according to an example embodiment. The system 200 includes an underlay network 210, an overlay network 220, and a network controller 230, such as the underlay network 110, the overlay network 120, and the network management service 130, respectively, of FIG. 1.

The underlay network 210 includes network devices 212*a-j* such as spine switches and gateway nodes 214*a-i* such as VTEPs 116*a-m* of FIG. 1. The overlay network 220 includes access devices 216*a-h* such as access points, routers, switches, etc. The network controller 230 executes the flow state analyzer that performs end-to-end path tracing and debuggability for the TRM traffic flows.

In the system 200, each network device exports telemetry data to the network controller 230, shown at 240. In case of the gateway nodes 214*a-n*, the telemetry data includes tenant flow data records in which a merging or mapping between the underlay information and the overlay information is included (e.g., to link encapsulated source and group information with tenant source and group information). In other words, the underlay information is linked, mapped, and associated to various overlay information at a respective gateway node. In the system 200, each gateway node performs a certain amount of merging or linking of the underlay information with an overlay information to generate the tenant flow data record.

Figure 4:
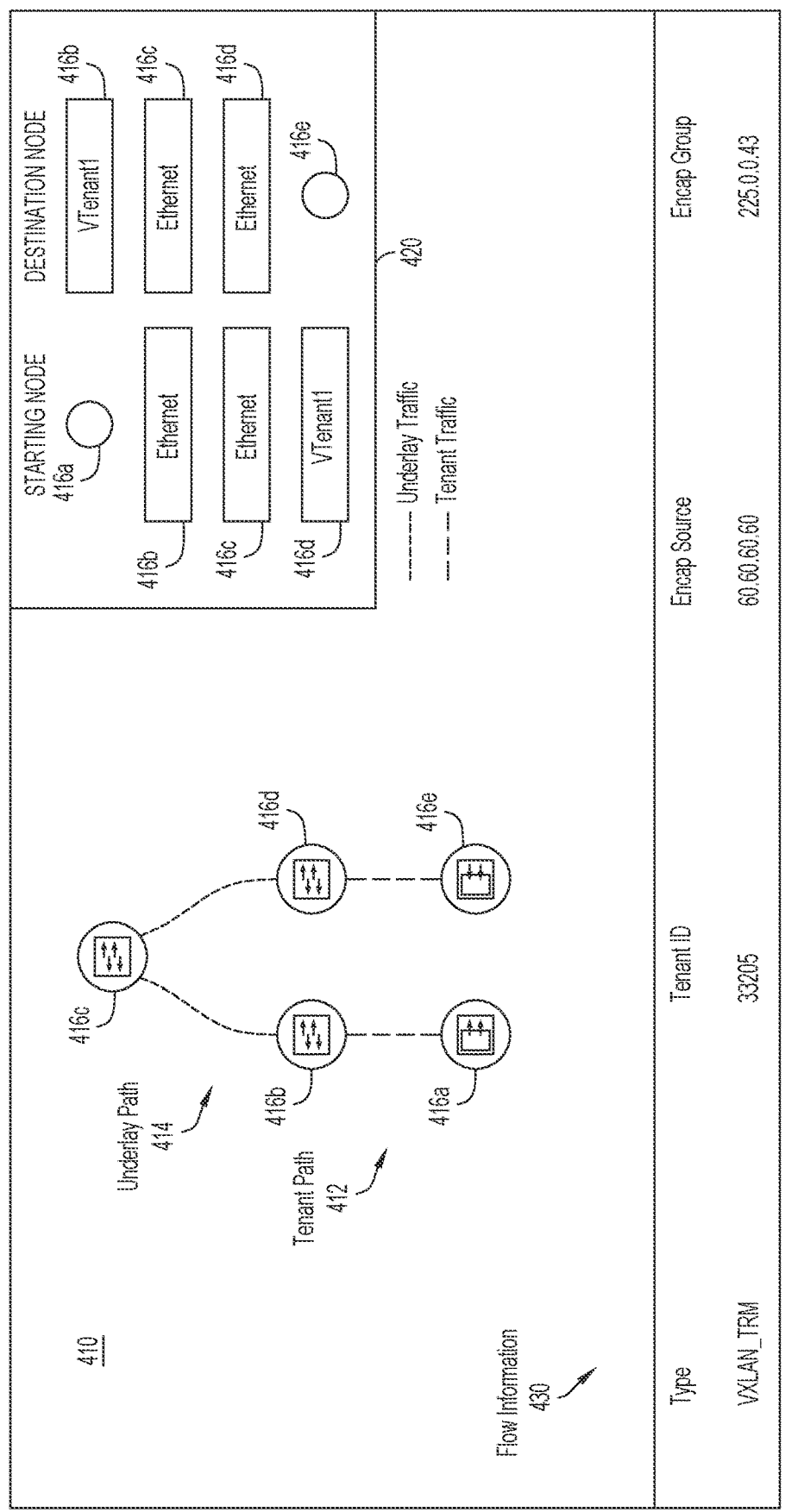
FIG. 4 is a diagram depicting a user interface that provides end-to-end visibility for a path traversed by a TRM traffic flow including a tenant path and an underlay path, according to an example embodiment.

The network controller 230 is then configured to model or generate additional objects such as merged flow records to provide visibility of the end-to-end path traversed by a TRM traffic flow. The end-to-end path includes a tenant path and an underlay path. The tenant path and the underlay path are visualized in a distinguishable manner such as different shadings, color, size, shape, etc., as shown in FIG. 4.

In the system 200, flow data is collected in an intelligent and controlled manner by having the gateway nodes 214*a-i* generate tenant flow data records. That is, with respect to multicast flows within a VXLAN network, it is important to collect, organize, and represent data that identifies the path traversed by any TRM traffic flow from the source to the receivers. The network controller 230 includes a flow path visibility tool (i.e., the flow path visualization component) that collects per-flow, per-network device data from each network device, and exports it to a fabric-controller interface for graphical visualization (i.e., the network controller 230).

Figure 3:
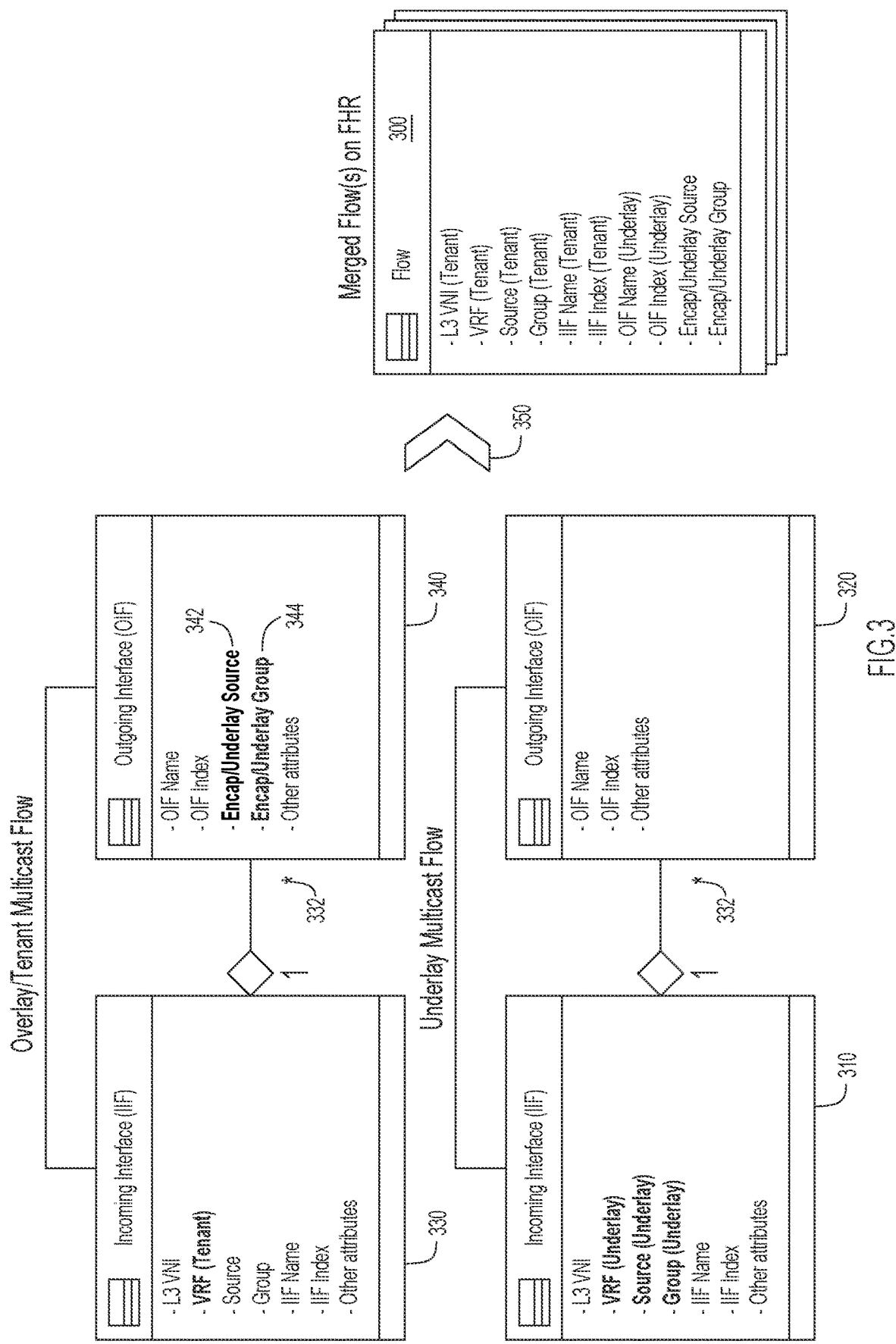
FIG. 3 is a diagram illustrating a merged flow data record for a TRM traffic flow, generated based on one or more tenant flow data records, according to an example embodiment.

With continued reference to FIGS. 1 and 2, FIG. 3 is a diagram illustrating a merged flow data record 300 for a TRM traffic flow, generated based on one or more tenant flow data records, according to an example embodiment. The merged flow data record 300 is generated by the flow visualization component that may be provided by the network management service 130 of FIG. 1 or by the network controller 230 of FIG. 2, or by some other entity or entities such as one or more computing devices of FIG. 8.

The merged flow data record 300 is based on flow data records provided at 240 of FIG. 2. The flow data records include a first data record for underlay multicast incoming interface (IIF) (underlay multicast IIF 310), a second data record for underlay multicast outgoing interface (OIF) (underlay multicast OIF 320), a third data record for overlay tenant multicast IIF (tenant multicast IIF 330) and a fourth data record for overlay tenant multicast OIF (tenant flow data record 340). That is, the underlay multicast IIF 310, underlay multicast OIF 320, tenant multicast IIF 330, and tenant flow data record 340 are generated by the VTEPs 116*a-m* of FIG. 1 or by the gateway nodes 214*a-i* of FIG. 2.

The underlay multicast IIF 310 includes information about an incoming TRM traffic flow such as L3 virtual network identifier (VNI), underlay virtual routing function (VRF), underlay source, underlay group, IIF name, IIF index, and other attributes. The underlay multicast IIF 310 maps to various underlay multicast outgoing interfaces, shown at 312. Each of the underlay multicast OIF 320 includes an OIF name, OIF index, and other attributes.

The tenant multicast IIF 330 includes L3 VNI for the tenant, VRF for the tenant, tenant source, tenant group, tenant IIF name, tenant IIF index, and other attributes. The tenant multicast IIF 330 maps to various tenant flow data records, shown at 332. Each of the tenant flow data record 340 includes tenant OIF name, tenant OIF index, and underlay encapsulation information such as an encapsulation or underlay source 342 and an encapsulation or underlay group 344 that is obtained from the underlay multicast IIF 310.

As noted above, in VXLAN TRM networks, the FHR encapsulates overlay (tenant) multicast data with underlay (carrier) network (including underlay S and underlay G) and the LHR decapsulates the overlay (tenant) multicast data. The FHR (e.g., a network switching component) handles the mapping of the overlay tenant information to the underlay encapsulation information prior to exporting the TRM traffic flow along with other flow related data records (e.g., underlay multicast IIF 310, underlay multicast OIF 320, and tenant multicast IIF 330) to the flow path visualization component.

The flow path visualization component uses the per-flow data such as the Overlay-to-Underlay mapping, incoming and outgoing interfaces and the role of the node (FHR/LHR) to generate a complete and reliable end-to-end path of the TRM multicast traffic flow for visualization. As any end-to-end flow traverses both the virtual overlay network and the physical underlay network, the flow path visualization component accounts for these layers and depicts the overlay and underlay traffic separately or in a distinguishable manner e.g., with different colors for easy identification.

The flow path visualization component realizes first class flow object for both underlay and overlay/tenant VRFs by merging switch incoming interface (IIF) and corresponding OIF list to generate merged flow data records, shown at 350.

Tenant outgoing interface (OIF) model (the tenant flow data record 340) maintains involved by including the underlay or encapsulation information such as the underlay source 342 and the encapsulation or underlay group 344. This encapsulation information, generated on the FHR, is then used to merge overlay and underlay flow records (the underlay multicast IIF 310, the underlay multicast OIF 320, the tenant multicast IIF 330, and the tenant flow data record 340) to generate a single flow object i.e., the merged flow data record 300.

The merged flow data record 300 includes tenant incoming interface and default VRF outgoing interface. In one example, the merged flow data record 300 includes tenant L3 VNI, tenant VRF, tenant source, tenant group, tenant IIF name, tenant IIF index, underlay OIF name, underlay OIF index, the underlay source 342, and the encapsulation or underlay group 344.

Based on the merged flow data record 300, end-to-end path traversed by the TRM traffic flow is constructed. The end-to-end path includes the tenant path and the underlay path, which are provided in a distinguishable manner.

With continued reference to FIGS. 1-3, FIG. 4 is a diagram depicting a user interface 400 that provides end-to-end visibility for a path traversed by a TRM traffic flow including a tenant path and an underlay path, according to an example embodiment. The end-to-end path is constructed and visualized by a flow path visualization component that may be provided by one or more computing devices such as the network management service 130 of FIG. 1 or the network controller 230 of FIG. 2. The user interface 400 includes a visualization 410 of the end-to-end path traversed by the traffic flow, link details 420, and flow information 430.

The end-to-end path for the TRM traffic flow is constructed across all network nodes involved using source, group, and receivers in each virtual routing function (VRF). For TRM traffic flows, a shortest path flow traversal is performed starting from FHR and using the underlay source and underlay group information from the merged flow data record 300 of FIG. 3.

Visualization 410 provides the end-to-end path including a tenant path 412 and an underlay path 414. The visualization 410 includes a source 416a, a first hop router 416b, a network spine node 416c, a last hop router 416d, and a receiver 416e. The links of the tenant path 412 are shown in a distinguishable manner from the links of the underlay path 414.

Link details 420 provide information about the links or each hop along the path and may include information such as an address of the sending node, an address of the receiving node, and a type of node for each hop along the path. For example, special indicators may be provided to illustrate that the node is a sender, receiver, FHR, LHR, etc. The source 416a and the receiver 416e are depicted with special indicators to indicate a source and destination, respectively. The first hop router 416b includes a tenant multicast information when it is the receiver and includes underlay multicast information (ethernet) when it is the sender that encapsulated the TRM traffic flow.

Flow information 430 includes one or more attributes of the TRM traffic flow. Flow information may include information from the merged flow data record 300 such as the type of overlay and underlay (e.g., VXLAN Tenant Routed Multicast), tenant identification, underlay source, and underlay group. Flow information 430 provides underlay information such as encapsulation/underlay source and encapsulation/underlay group associated with the tenant.

Additionally, using the actual traced or tracked end-to-end path traversed by the TRM traffic flows (as opposed just expected or estimated path), the flow state validation component determines states of the TRM traffic flows, monitors the TRM traffic flows, and identifies problems with the TRM traffic flows for troubleshooting and reconfigurations.

With continued reference to FIGS. 1-4, FIG. 5 is a diagram depicting another user interface 500 that provides states for TRM traffic flows, according to an example embodiment. The TRM traffic flows are classified by the flow state validation component provided by one or more computing devices such as the network management service 130 of FIG. 1 or the network controller 230 of FIG. 2. The flow state validation component determines the states or statuses for TRM traffic flows to aid with troubleshooting network issues with respect to the TRM traffic flows. The flow state validation component may generate the user interface 500 for monitoring and debugging TRM traffic flows.

The user interface 500 includes a flow listing 510 that lists a plurality of TRM traffic being monitored. For each flow, a plurality of attributes 512a-v are provided. In one example embodiment, the plurality of attributes 512a-v include an identification of VRF 512a, an encapsulation type 512b such as VXLAN_TRM, multicast IP address 512c, a flow link state 512d, an identification or address of a source 512e (sender), a receiver interface IP 512f, an identification of a sending network node 512g such as a FHR, an identification of a sender interface 512h such as VLANxxx, identification of a receiving network node 512i such as the LHR, an identification of a receiver interface 512j such as VLAN/Ethernet, time stamps 512k, and other attributes.

Based on the merged flow data record 300 of FIG. 3, on each node along the end-to-end path traversed by the TRM traffic flow, the flow state validation component performs a check for a corresponding receiver/destination in overlay virtual routing function (tenant VRF).

If the receiver is found, then the TRM traffic flow is classified as an active flow. For each TRM traffic flow, the user interface 500 provides associated encapsulation source and encapsulation group (the underlay information), shown at 514. If the flow state validation component is unable to find any receivers for a TRM traffic flow with an overlay source S and group G, then the TRM traffic flow is classified as a sender-only flow. Similarly, if one or more receivers are present without any sender, then the TRM traffic flow is classified as a receiver-only flow. If the path between sender and receiver endpoints is broken, then the flow state validation component classifies the TRM traffic flow as an inactive flow. That is, the flow link state 512d is selected from among active state, inactive state, sender only state, receiver only state.

By classifying the traffic flows into various categories, the flow state validation component separates and identifies various network issues with TRM traffic flows and triggers troubleshooting, debugging, and/or reconfigurations within the TRM network e.g., switch flow to a different network node, virtual port, etc.

For example, in a VXLAN multicast network, not only can failures occur on any network node along the end-to-end path traversed by the encapsulated TRM traffic flow, but these failures vary in nature e.g., link down, network node down, bandwidth issue, etc. Given many forms of failures (root causes), it is necessary to inspect each node along the end-to-end path traversed by the TRM traffic flow to identify the point of failure and reasons. To achieve this, the flow state validation component uses end-to-end path generated by the flow path visualization component and performs an in-depth, node-by-node, analysis of the TRM multicast traffic flow.

In one example embodiment, the debugging or troubleshooting is based on user input. For example, a user or network operator may select a TRM traffic flow to be analyzed from the traffic flow listing 510. As another example, input may include TRM traffic flow information such as source IP address, destination/group IP address, Tenant VRF of the selected or target TRM traffic flow. As yet another example, the input may include a network node identifier (switch ID) and expected outgoing interface that identifies the network device and the interface where the TRM traffic flow is expected to be received but is not receiver or is received but is malformed. That is, the user input may be the starting point for debugging and troubleshooting.

In one example embodiment, the flow state validation component analyzes the TRM traffic flow based on a few different aspects related to control-plane and data-plane of TRM network. The flow state validation component analyzes the TRM traffic flow, starting from the receiver node to determine if the TRM traffic flow state exists in the control-plane on every node along the end-to-end path i.e., until the source node. If the TRM traffic flow is present on every node, then the expected incoming and outgoing interfaces are compared to content in the flow data records of the TRM traffic flow. If these conditions are not met, then a failure point is recorded, and the user is alerted. If the flow-state in control plane is as expected, then flow state validation component performs a consistency-check between states of control-plane and all the layers of data-plane (hardware). With this, the user can identify if the data-plane programming is in sync with the control-plane. Lastly, the flow state validation component may also invoke built in tools to inspect hardware registers and routing lookup results for a given packet belonging to a given TRM traffic flow.

With these debugging, when a user selects a failed TRM traffic flow, the location and reason for the failure is determined by the flow state validation component. As such, user intervention is eliminated. Further, time and costs associated with debugging or troubleshooting a TRM traffic flow issue are reduced.

With continued reference to FIGS. 1-5, FIG. 6 is a diagram depicting yet another user interface 600 that identifies a network issue in an end-to-end path traversed by a TRM traffic flow, according to an example embodiment. The end-to-end path 610 includes an underlay path 612 and an overlay path 614. The end-to-end path 610 is similar to the end-to-end path in the user interface 400 of FIG. 4. While the end-to-end path 610 is generated by the flow path visualization component, the flow state validation component determines and provides the root cause of the problem and possible solutions.

For example, by selecting a particular TRM traffic flow, the topology information for the flow with a visual identification of the location of the TRM traffic flow issue is shown at 620 and reasons for the failure are shown at 622. That is, the last hop router 416d is determined to be the location of the network issue. The flow state validation component that identifies the type of network issue such as a missing route on the last hop router 416d (i.e., control plane or hardware, a null reverse path forwarding or OIF in the control plane/hardware, and/or inconsistencies of the OIF states between the control plane and the hardware). These are just some examples of the network issues that may be determined by the flow state validation component.

In one or more example embodiments, the flow state validation component further performs proactive monitoring such that if an active TRM traffic flow experiences no traffic or packet drops, the flow state validation component triggers debugging or troubleshooting to determine the location and reasons for the failure(s).

In one or more example embodiments, the flow state validation component further performs reactive monitoring based on user input. The user may select a particular TRM traffic flow to debug or troubleshoot. The user may further input a starting point for the debugging. For example, the user may specify the expected tenant output interface for the TRM traffic flow, etc. As such, the location and root cause of the problem may be identified more accurately and faster.

The techniques provided herein involve the flow state analyzer for the TRM traffic flow that provides path traceability with visualization of an end-to-end path traversed by the TRM traffic flows and with debuggability of the TRM traffic flows. Hence, the flow state analyzer provides observability to TRM networks by visualization and determinations of the states of the TRM multicast flows internal to the TRM network. The techniques achieve VXLAN TRM network observability.

The techniques may be end-user controlled and interactive for collecting, visually representing, and analyzing TRM traffic flow data across relevant nodes thus reducing the time and human involvement needed to debug TRM traffic flows. Thus, the quality and reliability of the TRM networks may be improved and the time and cost needed to resolve network issues may be reduced.

The techniques presented herein perform consistency checks to confirm that whatever states have been learnt by the routing protocols have been correctly installed all the way down to the hardware. The techniques presented herein are per-switch, hop-by-hop traversal where not just multicast states are checked but also interface states, properties, statistics, etc. Also, the techniques presented herein may involve user input as the source of truth or the starting point. The techniques presented here may identify faulty network device(s) where issue is occurring (location) and may specify the root cause of the failure (missing link, misconfiguration, inconsistencies, protocol misconfigurations/misbehaviors, etc.).

Figure 7:
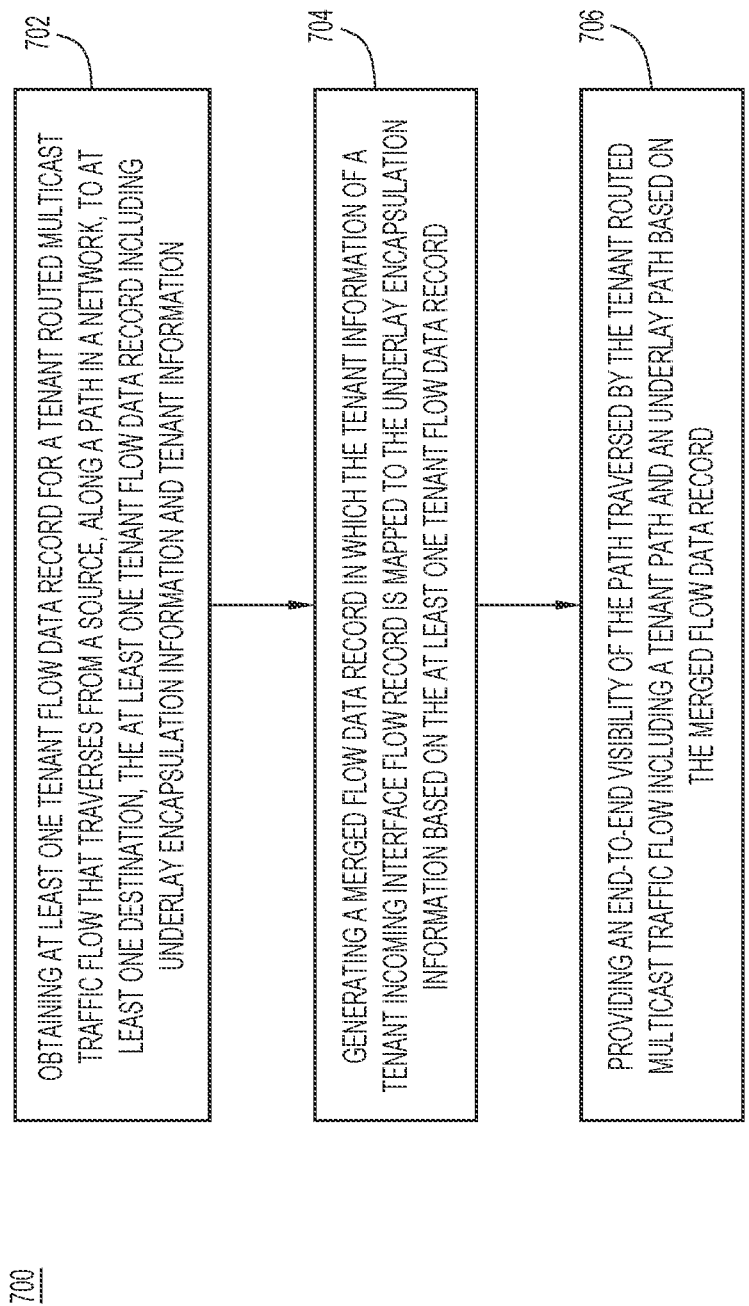
FIG. 7 is a flowchart illustrating a method of providing an end-to-end path visibility for a TRM traffic flow including a tenant path and an underlay path based on a merged flow data record, according to an example embodiment.

FIG. 7 is a flowchart illustrating a method 700 of providing an end-to-end path visibility for a TRM traffic flow including a tenant path and an underlay path based on the merged flow data record, according to an example embodiment. The method 700 may be performed by a computing device such as a server or a group of servers, the network management service 130 of FIG. 1, the network controller 230 of FIG. 2, that executes the flow state analyzer.

The method 700 involves, at 702, obtaining at least one tenant flow data record for a tenant routed multicast traffic flow that traverses from a source, along a path in a network, to at least one destination. The at least one tenant flow data record includes underlay encapsulation information and tenant information.

The method 700 further involves at 704, generating a merged flow data record in which the tenant information of a tenant incoming interface flow record is mapped to the underlay encapsulation information based on the at least one tenant flow data record.

The method 700 further involves at 706, providing an end-to-end visibility of the path traversed by the tenant routed multicast traffic flow including a tenant path and an underlay path based on the merged flow data record.

According to one or more example embodiments, the at least one tenant flow data record may be generated at a first hop node along the path in the network. The at least one tenant flow data record may include the tenant information for a tenant outgoing interface and the underlay encapsulation information from an underlay incoming interface flow record.

In one form, the underlay encapsulation information may include at least an underlay source and an underlay group. The operation 706 of providing the end-to-end visibility of the path may include providing the tenant path and the underlay path in a distinguishable manner.

In another form, the underlay encapsulation information may include at least an underlay source and an underlay group. The operation 704 of generating the merged flow data record may include obtaining the tenant incoming interface flow record that includes a tenant source and a tenant group and mapping the underlay source and the underlay group to the tenant source and the tenant group based on the at least one tenant flow data record.

In one instance, the method 700 may further involve determining a state of the tenant routed multicast traffic flow from a plurality of traffic states based on the end-to-end visibility of the path traversed by the tenant routed multicast traffic flow. The plurality of traffic states may include an active flow, an inactive flow, a sender only flow, and a receiver only flow. The method 700 may further involve providing the state of the tenant routed multicast traffic flow for troubleshooting.

In another instance, the method 700 may further involve analyzing each of a plurality of network nodes along the path for both the underlay path and the tenant path based on the end-to-end visibility of the path. The method 700 may further involve determining whether a network connectivity problem for the tenant routed multicast traffic flow exists based on analyzing each of the plurality of network nodes.

In one form, the method 700 may further involve determining a problem source of the network connectivity problem based on determining that the network connectivity problem exists. The problem source may include a respective network node from the plurality of network nodes and a respective layer selected from the underlay path and the tenant path.

According to one or more example embodiments, the method 700 may further involve obtaining an input including an identification of the tenant routed multicast traffic flow and validating the underlay path and the tenant path of the tenant routed multicast traffic flow identified in the input based on the end-to-end visibility of the path.

In one instance, the identification of the tenant routed multicast traffic flow may include one or more of: information about the source, a group, tenant virtual routing and forwarding, a network node, and an expected outgoing interface of the network node.

Figure 8:
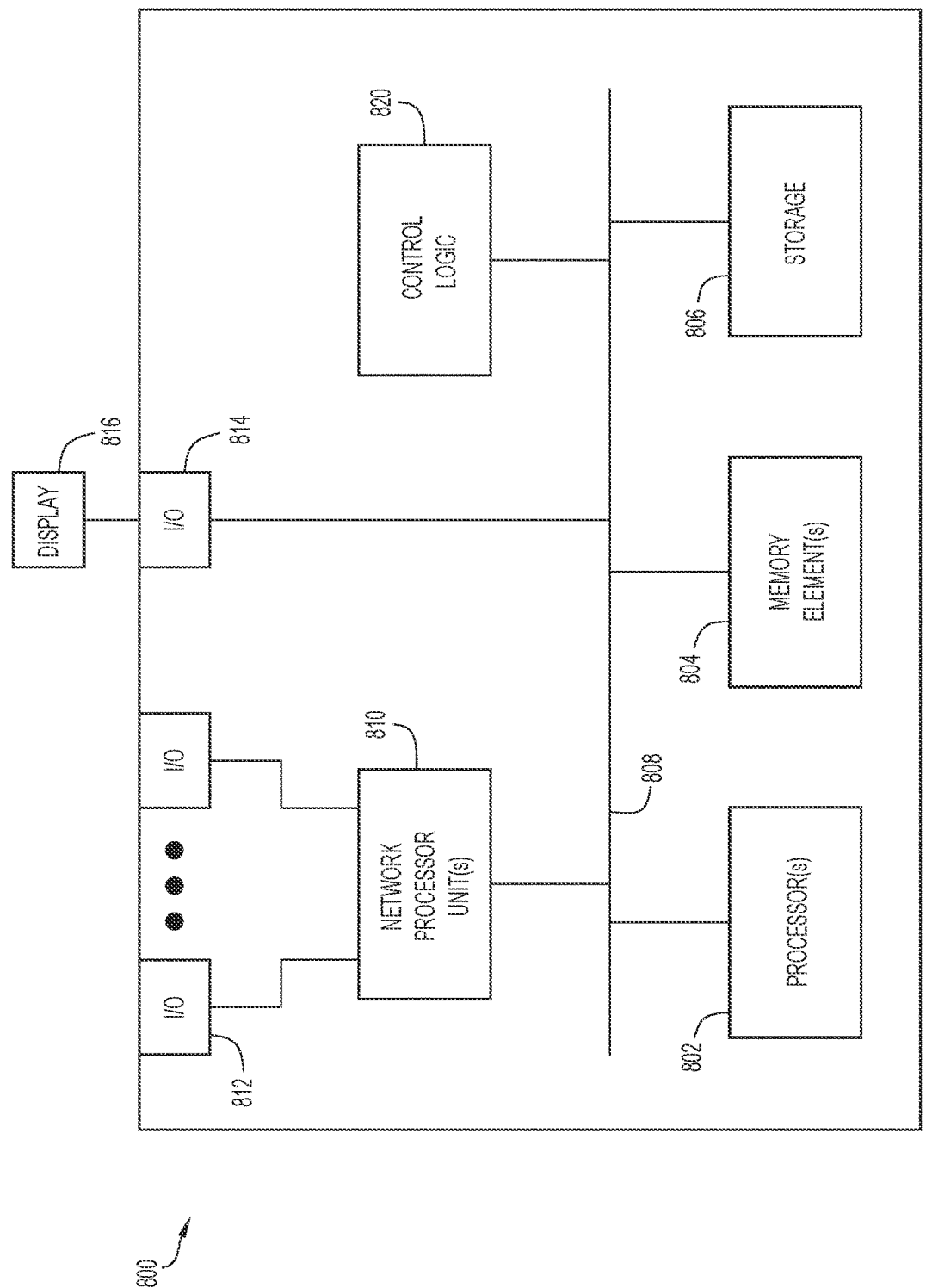
FIG. 8 is a hardware block diagram of a computing device that may perform functions associated with any combination of operations in connection with the techniques depicted and described in FIGS. 1-7, according to various example embodiments.

FIG. 8 is a hardware block diagram of a computing device 800 that may perform functions associated with any combination of operations in connection with the techniques depicted in FIGS. 1-7, according to various example embodiments, including, but not limited to, operations of the computing device or one or more servers that execute the flow state analyzer such as the network management service 130 of FIG. 1 or the network controller 230 of FIG. 2. Further, the computing device 800 may be representative of one of the endpoints 122*a-k* of FIG. 1 or the endpoints 216*a-h* of FIG. 2. Further, the computer device 800 may be representative of one of network devices such as spine network nodes 114*a-n* of FIG. 1, VTEPs 116*a-m* of FIG. 1, network devices 212*a-j* of FIG. 2, or gateway nodes 214*a-i*. It should be appreciated that FIG. 8 provides only an illustration of one example embodiment and does not imply any limitations with respect to the environments in which different example embodiments may be implemented. Many modifications to the depicted environment may be made.

In at least one embodiment, computing device 800 may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with one or more memory elements 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, and/or any other I/O port(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computing device 800. For example, I/O interface(s) 814 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a display 816 such as a computer monitor, a display screen, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided. The apparatus includes a memory, a network interface configured to enable network communications, and a processor. The processor is configured to perform a method including obtaining at least one tenant flow data record for a tenant routed multicast traffic flow that traverses from a source, along a path in a network, to at least one destination, the at least one tenant flow data record including underlay encapsulation information and tenant information. The method further includes generating a merged flow data record in which the tenant information of a tenant incoming interface flow record is mapped to the underlay encapsulation information based on the at least one tenant flow data record. The method further involves providing an end-to-end visibility of the path traversed by the tenant routed multicast traffic flow including a tenant path and an underlay path based on the merged flow data record.

In yet another example embodiment, one or more non-transitory computer readable storage media encoded with instructions are provided. When the media is executed by a processor, the instructions cause the processor to execute a method that includes obtaining at least one tenant flow data record for a tenant routed multicast traffic flow that traverses from a source, along a path in a network, to at least one destination. The at least one tenant flow data record including underlay encapsulation information and tenant information. The method further includes generating a merged flow data record in which the tenant information of a tenant incoming interface flow record is mapped to the underlay encapsulation information based on the at least one tenant flow data record and providing an end-to-end visibility of the path traversed by the tenant routed multicast traffic flow including a tenant path and an underlay path based on the merged flow data record.

In yet another example embodiment, a system is provided that includes the devices and operations explained above with reference to FIGS. 1-8.

The programs described herein (e.g., control logic 820) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 806 and/or memory elements(s) 804 can store data, software, code, instructions (e.g., processor instructions), logic, parameters, combinations thereof, and/or the like used for operations described herein. This includes the storage 806 and/or memory elements(s) 804 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   obtaining at least one tenant flow data record for a tenant routed multicast traffic flow that traverses from a source, along a path in a network, to at least one destination, the at least one tenant flow data record including underlay encapsulation information and tenant information;
   generating a merged flow data record in which the tenant information of a tenant incoming interface flow record is mapped to the underlay encapsulation information based on the at least one tenant flow data record; and
   providing an end-to-end visibility of the path traversed by the tenant routed multicast traffic flow including a tenant path and an underlay path based on the merged flow data record.

2. The method of claim 1, wherein the at least one tenant flow data record is generated at a first hop node along the path in the network and includes the tenant information for a tenant outgoing interface and the underlay encapsulation information from an underlay incoming interface flow record.

3. The method of claim 1, wherein the underlay encapsulation information includes at least an underlay source and an underlay group, and providing the end-to-end visibility of the path includes:
providing the tenant path and the underlay path in a distinguishable manner.

4. The method of claim 1, wherein the underlay encapsulation information includes at least an underlay source and an underlay group, and generating the merged flow data record includes:
obtaining the tenant incoming interface flow record that includes a tenant source and a tenant group; and
mapping the underlay source and the underlay group to the tenant source and the tenant group based on the at least one tenant flow data record.

5. The method of claim 1, further comprising:
determining a state of the tenant routed multicast traffic flow from a plurality of traffic states based on the end-to-end visibility of the path traversed by the tenant routed multicast traffic flow, wherein the plurality of traffic states include an active flow, an inactive flow, a sender only flow, and a receiver only flow; and
providing the state of the tenant routed multicast traffic flow for troubleshooting.

6. The method of claim 1, further comprising:
analyzing each of a plurality of network nodes along the path for both the underlay path and the tenant path based on the end-to-end visibility of the path; and
determining whether a network connectivity problem for the tenant routed multicast traffic flow exists based on analyzing each of the plurality of network nodes.

7. The method of claim 6, further comprising:
determining a problem source of the network connectivity problem based on determining that the network connectivity problem exists, wherein the problem source includes a respective network node from the plurality of network nodes and a respective layer selected from the underlay path and the tenant path.

8. The method of claim 1, further comprising:
obtaining an input including an identification of the tenant routed multicast traffic flow; and
validating the underlay path and the tenant path of the tenant routed multicast traffic flow identified in the input based on the end-to-end visibility of the path.

9. The method of claim 8, wherein the identification of the tenant routed multicast traffic flow includes one or more of: information about the source, a group, tenant virtual routing and forwarding, a network node, and an expected outgoing interface of the network node.

10. An apparatus comprising:
a memory;
a network interface configured to enable network communications; and
a processor, wherein the processor is configured to perform a method comprising:
obtaining at least one tenant flow data record for a tenant routed multicast traffic flow that traverses from a source, along a path in a network, to at least one destination, the at least one tenant flow data record including underlay encapsulation information and tenant information;
generating a merged flow data record in which the tenant information of a tenant incoming interface flow record is mapped to the underlay encapsulation information based on the at least one tenant flow data record; and
providing an end-to-end visibility of the path traversed by the tenant routed multicast traffic flow including a tenant path and an underlay path based on the merged flow data record.

11. The apparatus of claim 10, wherein the at least one tenant flow data record is generated at a first hop node along the path in the network and includes the tenant information for a tenant outgoing interface and the underlay encapsulation information from an underlay incoming interface flow record.

12. The apparatus of claim 10, wherein the underlay encapsulation information includes at least an underlay source and an underlay group, and the processor is configured to provide the end-to-end visibility of the path by:
providing the tenant path and the underlay path in a distinguishable manner.

13. The apparatus of claim 10, wherein the underlay encapsulation information includes at least an underlay source and an underlay group, and wherein the processor is configured to generate the merged flow data record by:
obtaining the tenant incoming interface flow record that includes a tenant source and a tenant group; and
mapping the underlay source and the underlay group to the tenant source and the tenant group based on the at least one tenant flow data record.

14. The apparatus of claim 10, wherein the processor is further configured to perform:
determining a state of the tenant routed multicast traffic flow from a plurality of traffic states based on the end-to-end visibility of the path traversed by the tenant routed multicast traffic flow, wherein the plurality of traffic states include an active flow, an inactive flow, a sender only flow, and a receiver only flow; and
providing the state of the tenant routed multicast traffic flow for troubleshooting.

15. The apparatus of claim 10, wherein the processor is further configured to perform:
analyzing each of a plurality of network nodes along the path for both the underlay path and the tenant path based on the end-to-end visibility of the path; and
determining whether a network connectivity problem for the tenant routed multicast traffic flow exists based on analyzing each of the plurality of network nodes.

16. The apparatus of claim 15, wherein the processor is further configured to perform:
determining a problem source of the network connectivity problem based on determining that the network connectivity problem exists, wherein the problem source includes a respective network node from the plurality of network nodes and a respective layer selected from the underlay path and the tenant path.

17. The apparatus of claim 10, wherein the processor is further configured to perform:
obtaining an input including an identification of the tenant routed multicast traffic flow; and
validating the underlay path and the tenant path of the tenant routed multicast traffic flow identified in the input based on the end-to-end visibility of the path.

18. One or more non-transitory computer readable storage media encoded with software comprising computer executable instructions that, when executed by a processor, cause the processor to perform a method including:
obtaining at least one tenant flow data record for a tenant routed multicast traffic flow that traverses from a source, along a path in a network, to at least one destination, the at least one tenant flow data record including underlay encapsulation information and tenant information;

generating a merged flow data record in which the tenant information of a tenant incoming interface flow record is mapped to the underlay encapsulation information based on the at least one tenant flow data record; and providing an end-to-end visibility of the path traversed by the tenant routed multicast traffic flow including a tenant path and an underlay path based on the merged flow data record.

19. The one or more non-transitory computer readable storage media according to claim 18, wherein the at least one tenant flow data record is generated at a first hop node along the path in the network and includes the tenant information for a tenant outgoing interface and the underlay encapsulation information from an underlay incoming interface flow record.

20. The one or more non-transitory computer readable storage media according to claim 18, wherein the underlay encapsulation information includes at least an underlay source and an underlay group and the computer executable instructions cause the processor to provide the end-to-end visibility of the path by:

providing the tenant path and the underlay path in a distinguishable manner.

* * * * *